United States Patent
Waring

(10) Patent No.: US 6,755,101 B1
(45) Date of Patent: Jun. 29, 2004

(54) LOW PROFILE IN-LINE BEVELER

(75) Inventor: Thomas Waring, Cambridge (CA)

(73) Assignee: Babcock & Wilcox Canada Ltd., Cambridge (CA)

( * ) Notice: Subject to any disclaimer, the term of this patent is extended or adjusted under 35 U.S.C. 154(b) by 0 days.

(21) Appl. No.: 10/447,748

(22) Filed: May 29, 2003

(51) Int. Cl.$^7$ ............................................... B23B 5/16
(52) U.S. Cl. ................................ 82/113; 82/46; 408/79
(58) Field of Search ........................... 82/113, 46, 82, 82/83; 408/79, 80, 105, 124, 128, 153

(56) References Cited

U.S. PATENT DOCUMENTS

| | | | |
|---|---|---|---|
| 2,682,181 A | 6/1954 | Toth et al. ........................ 77/2 |
| 2,749,809 A | 6/1956 | Anderson ....................... 90/12 |
| 2,924,152 A | 2/1960 | Zettler ............................ 90/11 |
| 3,228,268 A | 1/1966 | Strout ............................ 77/73 |
| 3,229,555 A | 1/1966 | Castles, Jr. ...................... 82/4 |
| 3,835,738 A | 9/1974 | Kellum et al. .................... 82/4 |
| 3,875,832 A | 4/1975 | Mayfield ......................... 82/4 |
| 3,917,187 A | * 11/1975 | Damour .................. 242/571.1 |
| 3,927,584 A | 12/1975 | Mayfield ......................... 82/4 |
| 3,992,123 A | 11/1976 | Uyetake et al. .............. 408/104 |
| 3,999,452 A | 12/1976 | Larsen ............................ 82/4 |
| 4,114,484 A | 9/1978 | Feamster, III .................... 82/4 |
| 4,199,286 A | 4/1980 | Kirkham ..................... 409/233 |
| 4,257,289 A | 3/1981 | Groothius ........................ 82/4 |
| 4,411,178 A | * 10/1983 | Wachs et al. ................. 82/113 |
| 4,434,689 A | 3/1984 | Nall et al. ........................ 82/4 |
| 4,437,366 A | * 3/1984 | Astle ............................ 82/113 |
| 4,449,871 A | 5/1984 | Hillestad ..................... 409/178 |
| 4,459,883 A | 7/1984 | Astle ............................... 82/4 |
| 4,470,734 A | * 9/1984 | Miller ........................ 409/175 |
| 4,483,522 A | 11/1984 | Nall et al. ................... 269/48.1 |
| 4,483,647 A | 11/1984 | Gardian et al. .............. 408/82 |
| 4,498,820 A | 2/1985 | Brennan ..................... 109/179 |
| 4,615,243 A | * 10/1986 | Davis ........................... 82/1.2 |
| 4,620,823 A | 11/1986 | Hillestad ..................... 409/178 |
| 4,761,104 A | 8/1988 | Hillestad ..................... 409/175 |
| 4,784,028 A | 11/1988 | Sandford .......................... 82/4 |
| 4,819,525 A | 4/1989 | Rabe ........................... 82/1.11 |
| 4,889,454 A | 12/1989 | Hillestad et al. ............. 408/124 |
| 4,915,552 A | 4/1990 | Hillestad et al. ............. 408/125 |
| 5,007,778 A | 4/1991 | Hillestad et al. ............. 408/125 |
| 5,033,347 A | 7/1991 | Hillestad et al. .............. 83/487 |
| 5,069,094 A | 12/1991 | Birkestrand ................... 82/121 |
| 5,077,456 A | 12/1991 | St. Louis .................... 219/69.1 |
| 5,393,176 A | 2/1995 | Waring ....................... 408/105 |
| 5,531,550 A | 7/1996 | Moruzzi ..................... 409/179 |
| 5,641,168 A | 6/1997 | Kanaan ...................... 279/46.7 |
| 5,711,197 A | 1/1998 | Ohmi et al. ................... 82/113 |
| 5,954,462 A | 9/1999 | Way et al. ................... 408/153 |
| 5,979,267 A | 11/1999 | Yonezawa ..................... 74/531 |
| 6,082,235 A | 7/2000 | Kramer ....................... 82/113 |
| 6,202,522 B1 | 3/2001 | Tremblay ..................... 82/113 |
| 6,279,437 B1 | 8/2001 | Way ............................. 82/113 |
| 6,309,145 B1 | 10/2001 | Tremblay et al. ........... 408/1 R |

FOREIGN PATENT DOCUMENTS

GB          434676          9/1935

* cited by examiner

Primary Examiner—Willmon Fridie, Jr.
(74) Attorney, Agent, or Firm—Kathryn W. Grant; Eric Marich

(57) ABSTRACT

A compact, low-profile, in-line beveling tool suitable for use in a confined space, such as a tightly packed array of tubes. The tool is inserted within a workpiece via a feeding mechanism, such as a worm gear arrangement, and is secured to the workpiece via an internal expanding mandrel assembly. A motor drives cutting inserts, mounted on a beveling head, in rotational motion to bevel the workpiece. The motor and beveling head with cutter inserts all share the same axis. A gear reduction box, located between and operatively connected with the motor and beveling head, provides the low RPM and high torque needed to make practical use of carbide insert technology. In one embodiment, the motor is a hollow core air motor having vanes symmetrically arranged about the axis.

13 Claims, 2 Drawing Sheets

LOW PROFILE IN-LINE BEVELER

FIELD AND BACKGROUND OF INVENTION

The present invention relates to beveling tools used to machine a bevel, for example to prepare the ends of tubes or pipes for subsequent welding operations.

Tubes in heat exchangers and reactors, such as the reactor feeders of CANDU power plants, are often arranged in a tightly packed array. As these tubes need repair and replacement, a beveling tool is needed for making repairs. In some cases it is preferable to make these repairs in-situ. This requires a tool that is compact and having a low profile, so that it can operate in the confined space of the tube array. Commercially available beveling tools are typically designed to present a low profile in one axis only. They can fit onto a tube or pipe between two adjacent tubes or pipes when all three are in line. They cannot fit into a nest of tubes or pipes, however, due to the drive motor, which typically is mounted on the side of the tool at 90° to the axis of the tube. There have been some attempts to overcome this limitation by mounting the motor on an axis parallel to the beveling axis, but this still leaves the motor on one side of the tool.

U.S. Pat. No. 4,889,454 issued Dec. 26, 1989 to Hillestad et al. describes a portable, hand held, gas operated rotary tool for milling a surface on the end of a cylindrical workpiece. The apparatus taught in this patent operates at an extremely high RPM, being adapted to turn at rotational speeds of 2,500 to 6,000 RPM, and very low torque. However, standard operating parameters recommended by cutting tool manufacturers for machining, for example, a 2.5" OD low carbon boiler tube with various cutting tools, are as follows:

| Type of cutting tool | Rec. Surface Speed (surface feet per minute, SFM) | Rec. Rotational Speed RPM |
|---|---|---|
| carbon steel | 25 | 38 |
| high speed steel | 50 | 76 |
| tungsten carbide | 250 | 328 |

In the above example, even tungsten carbide cutting tools cannot tolerate surface speeds >250 SFM. When cutting tools are operated at higher than recommended speeds, overheating and tool failure quickly follow. Thus if the apparatus of the Hillestad patent was used to machine a 2.5" OD low carbon boiler tube at the typical rotary speed of 2,500 to 6,000 RPM taught in the '454 patent, the cutting tool would attempt to remove material at a surface speed of 1636 to 3927 SFM (i.e. $\pi \times OD/12 \times RPM$). This is several times greater than the recommended surface speed for even a tungsten carbide cutting tool, which would quickly overheat and fail.

The Hillestad et al. patent further teaches an axial pin to stabilize the milling head. However, in order to make accurate, repeatable pipe bevels, the entire machining tool must be held rigid and stable. This is only possible when the tool is firmly clamped to the tube. The apparatus of the Hillestad et al. patent is thus only capable of producing crude manual weld preps, and could not be used to produce the precise "J" weld preps, known to those skilled in the art, which are required by present day automatic welding machines.

SUMMARY OF INVENTION

The present invention is drawn to a compact, low profile, in-line beveling tool apparatus suitable for use in a confined space. The overall diameter of the beveling apparatus is small, allowing access to the ends of tubes and pipes even within such a confined space. Commercially available beveling tools are not compact enough, and cannot be used for this application and others.

The present invention can be positioned, set-up and used remotely at any distance from the operator. It is therefore especially suited for use in high radiation areas for nuclear repair applications, where it is desirable for the operator to remain several feet away behind lead shielding. Further, the present invention is completely self-contained, and doesn't require an external device or an operator to hold onto it to resist the torque produced from the cutting action.

Accordingly, one aspect of the invention is drawn to a compact beveling tool suitable for use in a confined space, such as within a tube array.

Another aspect of the invention is drawn to a beveling tool which can be operated remotely, without the operator nearby.

Yet another aspect of the invention is drawn to a beveling tool capable of providing the high torque and low RPM required to make practical use of carbide cutting materials.

In one embodiment, the invention comprises apparatus for beveling an end of a workpiece having a longitudinal axis and a workpiece diameter perpendicular to the longitudinal axis. The apparatus includes a rotatable shaft having an axis of rotation that can be aligned with the longitudinal axis of the workpiece. The shaft has a first and second end, with mechanical means connected to the first end of the shaft for inserting a cutting portion of the apparatus into the workpiece. A housing having an outside diameter surrounds the shaft and has a beveling head mounted thereon adjacent the second end of the shaft. Cutter inserts are mounted on the beveling head. A motor and gear reductions means are contained within the housing surrounding the shaft. The gear reduction means is operatively connected to and located between the motor and the beveling head for producing high torque, low RPM rotary motion of the cutter inserts about the longitudinal axis of the workpiece.

In a further embodiment the invention comprises apparatus for beveling an end of a cylindrical workpiece, the workpiece having a longitudinal axis and a workpiece diameter perpendicular to the longitudinal axis. The embodiment includes a rotatable shaft having an axis of rotation that can be aligned with the longitudinal axis of the workpiece, with the shaft having a first and second end. A flexible cable is rotatably connected to a worm spur gear, the worm spur gear being mounted on the shaft adjacent the first end, for inserting the apparatus into the workpiece. A generally cylindrical housing, having an outside diameter approximately equal to the workpiece diameter, surrounds the shaft. The housing has a beveling head mounted thereon adjacent the second end of the shaft. Cutter inserts comprised of carbide material are mounted on the beveling head. A hollow core air motor surrounds the shaft for producing rotary motion of-the cutter inserts when the air motor is connected to a source of compressed air. A double set of planetary gears, contained within the housing surrounding the shaft, are located between and operatively connected with the motor and the beveling head. The gears are adapted to produce high torque, low RPM rotary motion of the cutter inserts about the longitudinal axis of the workpiece.

The various features of novelty which characterize the invention are pointed out with particularity in the claims annexed to and forming part of this disclosure. For a better understanding of the present invention, and the operating advantages attained by its use, reference is made to the accompanying drawing and descriptive matter, forming a part of this disclosure, in which a preferred embodiment of the invention is illustrated.

DESCRIPTION OF THE PREFERRED EMBODIMENTS

The subject invention is a beveling tool, generally designated 200, which can be used to machine a bevel for a weld preparation on a workpiece 10, such as on the end of a tube or pipe. The invention is particularly suited for use in a confined space.

Figure 1:
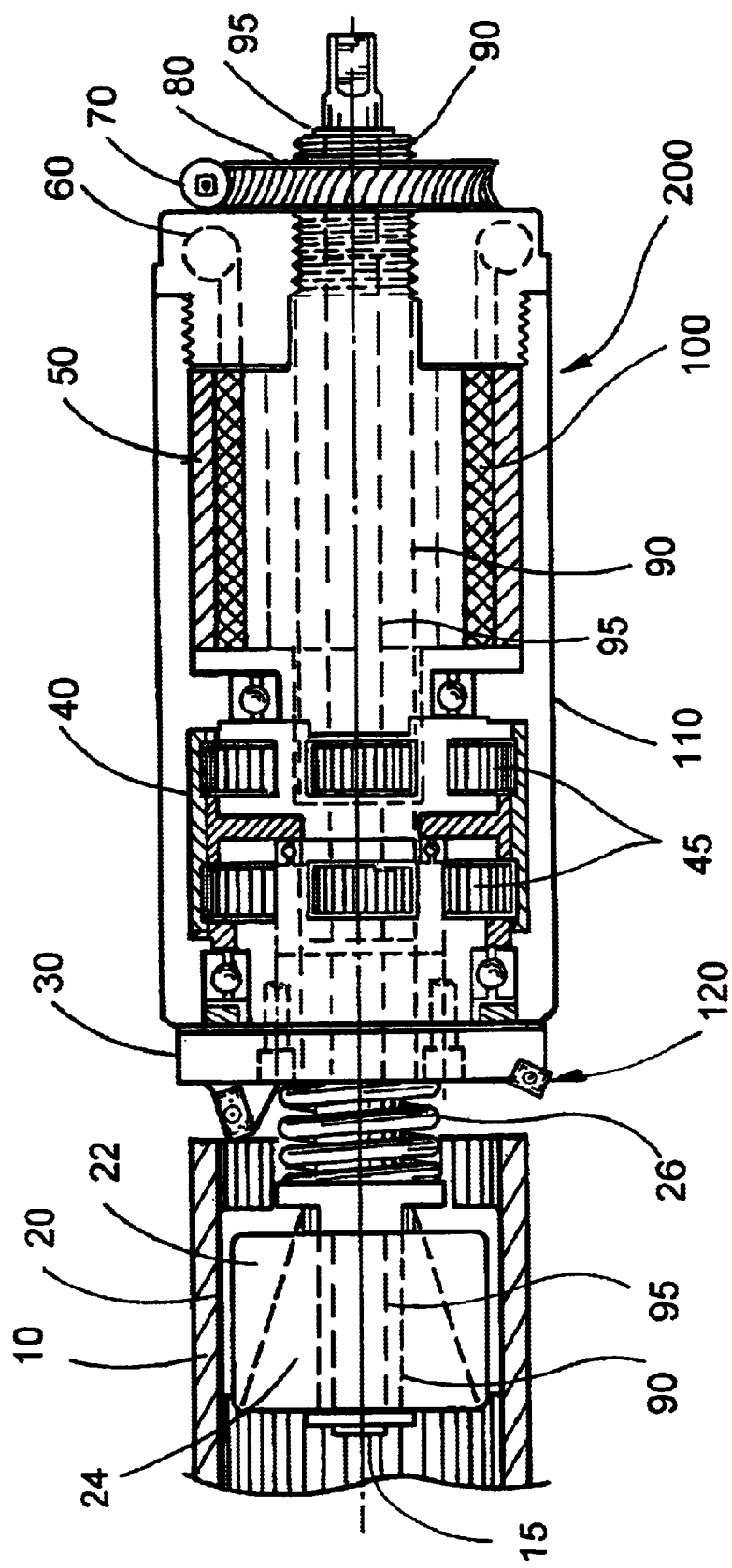
FIG. 1 is a cross sectional view of the subject invention.

As shown in FIG. 1, feed mechanism 70 is used to insert the cutting end, or front end, of the beveling tool 200 into the workpiece 10. Feed mechanism 70 is preferably attached to a flexible cable (not shown) which rotates a worm gear arrangement having a worm spur gear 80. Worm spur gear 80 is threaded onto an outer, hollow mandrel adjustment shaft 90, which passes through the core of the beveling tool 200. Rotation of the worm spur gear 80 feeds the cutting end of the beveling tool 200 into the workpiece 10.

Figure 2:
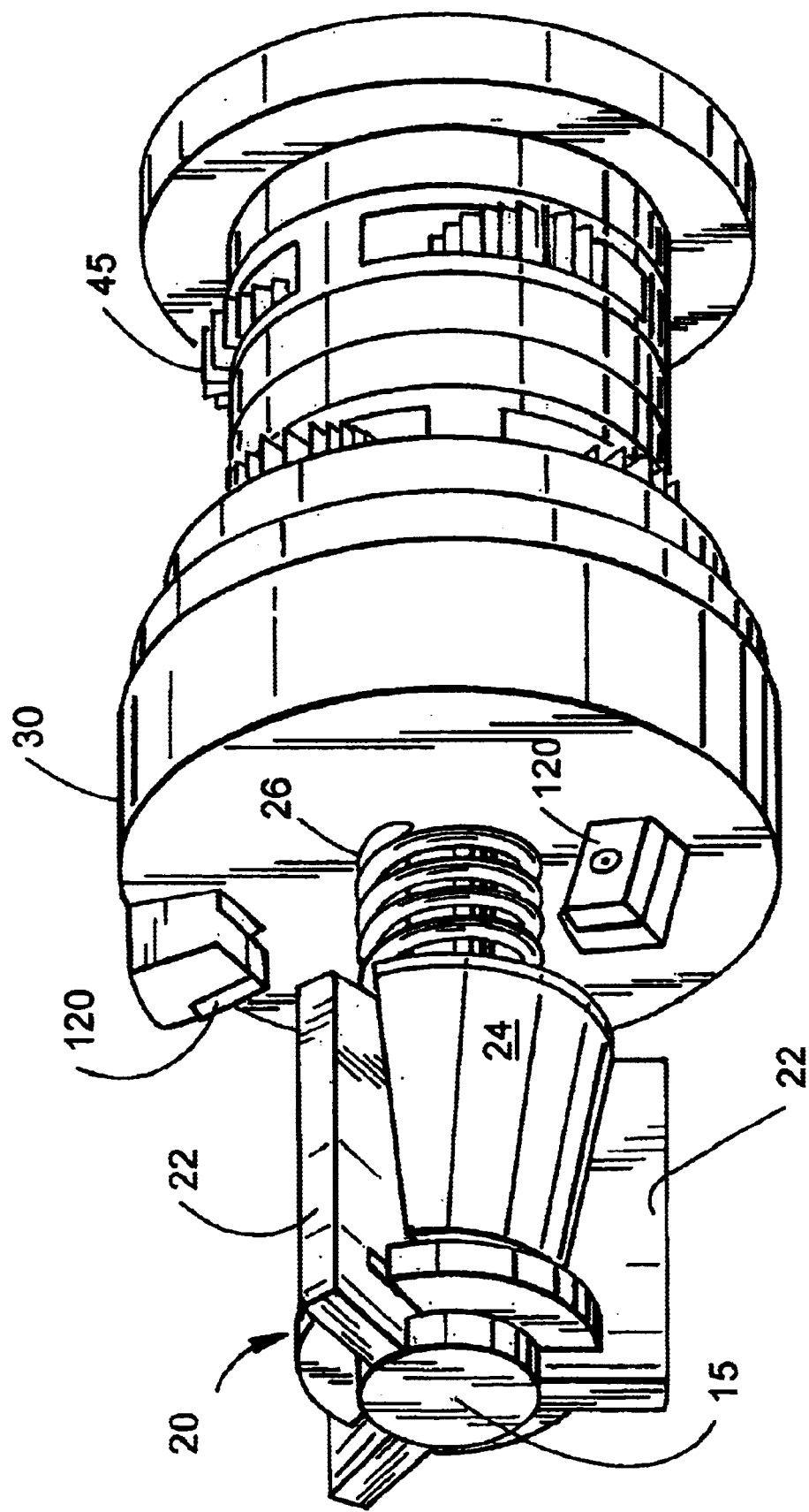
FIG. 2 is a partial perspective view of the subject invention with the motor gear housing removed.

Referring to both FIGS. 1 and 2, beveling tool 200 is secured to the workpiece via an internal expanding mandrel assembly 20. Mandrel assembly 20 has mating components, i.e. tapered sliding collets 22 and tapered inner cylinder 24, which have complementary tapers that allow sliding collets 22 to expand as the mating components are drawn past each other. The direction of the complementary tapers between the collets 22 and inner cylinder 24 is not critical, with one direction shown in FIG. 1 and the opposite direction shown in FIG. 2.

Mandrel assembly 20 is attached to the outer, hollow shaft 90. Shaft 90, and an inner shaft 95, concentric with shaft 90, pass through the center of beveling tool 200. Inner shaft 95 is designed to pull on mandrel assembly 20, in the manner of a draw bolt, causing it to expand. Inner cylinder 24, in the center of mandrel assembly 20, and outer shaft 90 are preferably machined from the one piece. Outer shaft 90 serves to provide inner shaft 95 with a surface to react against.

Turning inner shaft 95, by means of flats at the rear end, i.e. opposite the cutting end, of beveling tool 200, threads the shaft 95 into threaded stop collar 15, a small, hat-shaped piece projecting out of mandrel assembly 20. Threaded stop collar 15 is keyed to the center section of mandrel 20 to prevent it from rotating as shaft 95 is adjusted.

Inner cylinder 24 has tapered "tee" slots evenly spaced about its circumference, e.g. three slots spaced 120 degrees apart. A corresponding number of tapered sliding collets 22 are made to slide back and forth in the slots as threaded stop collar 15 reacts on their ends. The sliding collets 22 are keyed into the tee slots to prevent them from falling out.

As threaded stop collar 15 draws back, helical spring 26 biases inner cylinder 24 forward. This pushes the sliding collets 22 back and outward across inner cylinder 24, thereby expanding mandrel assembly 20 and securely engaging beveling tool 200 to the workpiece 10.

The beveling tool 200 is provided with a motor gear housing 110 arranged about shaft 90, which houses a high torque, hollow core air motor 50 and a gear reduction box 40. The cutting end of the beveling tool 200 has a beveling head 30 mounted on the front of motor gear housing 110. Cutter inserts 120, preferably made of carbide materials, are mounted on the beveling head 30. Cutter inserts 120 may be mounted radially offset and aligned at different angles to simultaneously produce bevels on both the inner and outer surfaces of workpiece 10.

Cutter inserts 120 are rotatably driven by air motor 50. Compressed air, typically at 50–90 psig (normal shop air supply) and provided via air inlet/outlet 60 from an air source (not shown), passes across vanes 100 within the hollow core air motor 50 causing the attached beveling head 30 to rotate about the shaft 90. Gear reduction box 40, located between and operatively connected to the hollow core air motor 50 and beveling head 30, contains a double set of planetary gears 45, which are used to achieve a high torque at a low RPM, for example 1200 RPM at no load, or about 300–400 RPM under load. The depth of cut, aggressiveness of the cut, air pressure, toughness of the material being machined, and the type of cutting inserts used, will all influence the loaded RPM.

The present invention offers several additional advantages over prior art beveling tools. Unlike current commercially available beveling tools, the feed mechanism 70, motor 50, and beveling head 30 all share the same axis. This results in a beveling tool with a low profile having a diameter only slightly larger than the workpiece 10 to be beveled. The invention further provides a beveling tool with a low profile for a full 360 degrees around its cutting axis.

The present invention also provides very high power for its size, estimated at 2–3 times the horse power of similarly sized machines.

The subject invention also produces the high torque at the low RPM required to take advantage of current carbide insert technology. Currently available machines have very low torque at the surface speeds required for consistent bevels. When run at higher surface speeds the cutting edges chip and break or otherwise fail even after one pipe bevel.

Another important advantage is the capability to bevel an individual tube, during replacement, without disturbing adjacent tubes, unlike other prior art tools.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles. For example, the beveling tool described above is a general purpose beveling tool, and is not limited to the beveling of individual reactor feeder tubes. Also, in an alternate embodiment, an electric motor could be used in place of the hollow core air motor.

I claim:

1. Apparatus for beveling an end of a workpiece, the workpiece having a longitudinal axis and a workpiece diameter perpendicular to the longitudinal axis, the apparatus comprising:

a rotatable shaft having an axis of rotation that is to be aligned with the longitudinal axis of the workpiece during beveling of the end of the workpiece, the shaft having a first and a second end;

mechanical means connected to the first end of the shaft for inserting a cutting portion of the apparatus into the workpiece;

a housing surrounding the shaft and having a beveling head mounted thereon adjacent the second end of the shaft, the housing having an outside diameter;

cutter inserts mounted on the beveling head; and a motor and gear reduction means, wherein the motor and gear reduction means are contained within the housing surrounding the shaft, the gear reduction means operatively connected to and located between the motor and the beveling head, for producing high torque, low RPM rotary motion of the cutter inserts about the longitudinal axis of the workpiece.

2. The apparatus according to claim 1, wherein the outside diameter of the housing is approximately equal to the workpiece diameter.

3. The apparatus according to claim 1, wherein the gear reduction means comprises a double set of planetary gears.

4. The apparatus according to claim 1, wherein the cutting inserts are comprised of a carbide material.

5. The apparatus according to claim 4, wherein the gear reduction means is adapted to drive the cutter inserts at a surface speed of about 250 SFM.

6. The apparatus according to claim 1, wherein the motor is an electric motor.

7. The apparatus according to claim 1, wherein the motor is an air motor surrounding the shaft for producing rotary motion of the cutter inserts when the air motor is connect to a source of compressed air.

8. The apparatus according to claim 1, wherein the apparatus has an expanding mandrel assembly, mounted on the second end of the shaft and adapted for insertion into the workpiece, for securing the apparatus to the workpiece.

9. The apparatus according to claim 1, wherein the means for inserting the cutting portion of the apparatus into the workpiece is a flexible cable rotatably connected to a worm spur gear fixed to the shaft.

10. Apparatus for beveling an end of a cylindrical workpiece, the workpiece having a longitudinal axis and a workpiece diameter perpendicular to the longitudinal axis, comprising:

a rotatable shaft having an axis of rotation that can be aligned with the longitudinal axis of the workpiece, the shaft having a first and second end;

a flexible cable rotatably connected to a worm spur gear, the worm spur gear mounted on the shaft adjacent to the first end, for inserting a cutting portion of the apparatus into the workpiece;

a generally cylindrical housing having an outside diameter approximately equal to the workpiece diameter, the housing surrounding the shaft and having a beveling head mounted thereon adjacent the second end of the shaft;

cutter inserts comprised of carbide material mounted on the beveling head;

a hollow core air motor surrounding the shaft for producing rotary motion of the cutter inserts when the air motor is connected to a source of compressed air;

a double set of planetary gears contained within the housing surrounding the shaft and located between and operatively connected with the motor and the beveling head, the gears adapted to product high torque, low RPM rotary motion of the cutter inserts about the longitudinal axis of the workpiece.

11. The apparatus to claim 10, wherein the apparatus has an expanding mandrel assembly, mounted on the second end of the shaft and adapted for insertion into a workpiece, for securing the apparatus to the workpiece.

12. The apparatus according to claim 10, wherein the planetary gears are adapted to drive the cutter inserts at a surface speed of about 250 SFM.

13. An apparatus for beveling an end of a workpiece, the workpiece having a longitudinal axis and a workpiece diameter perpendicular to the longitudinal axis, the apparatus comprising:

a rotatable shaft having an axis of rotation that can be aligned with the longitudinal axis of the workpiece, the shaft having a first end and a second end;

a feed mechanism operatively coupled to the first end of the shaft for inserting a cutting portion of the apparatus into the workpiece;

a housing surrounding the shaft and having a beveling head mounted thereon adjacent the second end of the shaft, the housing having an outer diameter;

cutter inserts mounted on the beveling head; and a motor and a reduction gear operatively coupled to the shaft for producing high torque, low RPM rotary motion of the cutter inserts about the longitudinal axis of the workpiece, wherein the motor and reduction gear are generally in axial alignment with the housing.

* * * * *